(No Model.)
M. DILLMEIER.
HOSE COUPLING.
No. 243,864. Patented July 5, 1881.
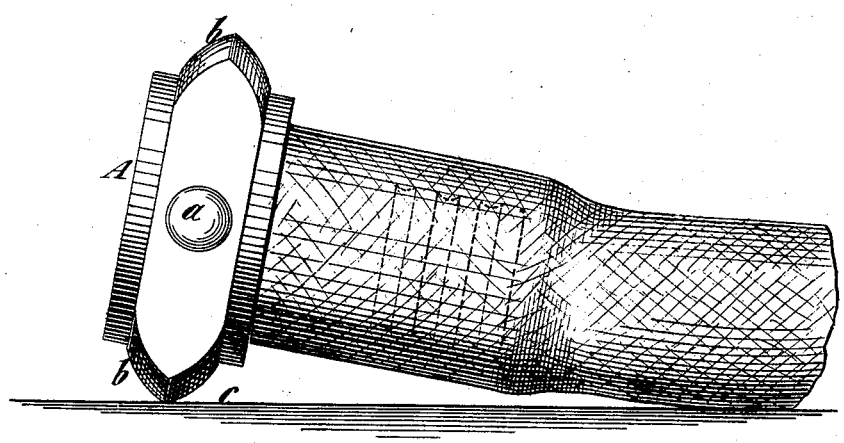
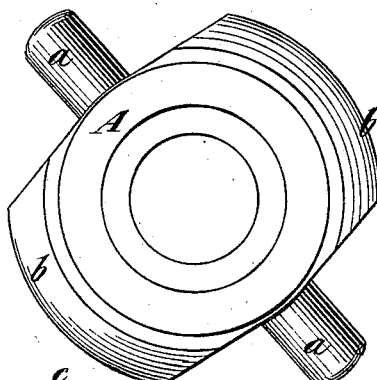

UNITED STATES PATENT OFFICE.

MICHAEL DILLMEIER, OF BROOKLYN, NEW YORK.

HOSE-COUPLING.

SPECIFICATION forming part of Letters Patent No. 243,864, dated July 5, 1881.

Application filed March 24, 1881. (No model.)

*To all whom it may concern:*

Be it known that I, MICHAEL DILLMEIER, of Brooklyn, in the county of Kings and State of New York, have invented a certain new and useful Improvement in Hose-Couplings, of which the following is a specification.

When the ordinary hose-coupling, the female part of which consists of a horn-band with an internal screw-thread, is thrown down and the portion of the band between the horns strikes hard upon the pavement or other hard surface, there is liability of the band being knocked out of shape and of the screw-thread being thereby so injured as to prevent the male and female parts from being readily screwed to together or unscrewed one from the other; and the object of my invention is to provide a coupling in which there shall be no such liability.

To this end my invention consists in an internally screw-threaded horn-band for a coupling having rigid horns projecting therefrom, and made in the same piece therewith, and also having between said horns projecting guards, which are formed in the same piece with said band, and greatly increase the thickness of metal at the points which are likely to be struck, or upon which the coupling is liable to strike, and to which a wrench may be applied for unscrewing the coupling in case the horns become broken off. The said guards are preferably V-shaped or beveled upon opposite sides toward the ends of the coupling, whereby with the same amount of metal a much greater projection of the guard is obtained and a more effective protection for the internal screw-thread is afforded, as the blow or striking point will be upon the edge of the angular or V-shaped guard.

In the accompanying drawings, Figure 1 represents a side view of a portion of a coupling with an attached hose, and which embodies my invention; and Fig. 2 represents an end view thereof.

Similar letters of reference designate corresponding parts in both the figures.

A designates the horn-band of an ordinary coupling, which is internally screw-threaded, and from which project two horns, *a*, in opposite directions.

Between the horns *a*, and upon opposite sides of the horn-band A, are projections *b*, which are shown as projecting nearly as far from the exterior surface of the horn-band A as do the horns *a*; and, as clearly shown in Fig. 2, these projections extend nearly the whole distance between the two horns *a* and form guards for the horn-band. When the coupling is thrown down, if it did not strike upon the end of one horn *a* it would probably strike upon one of the projections *b*; and even if the coupling were thrown down and should strike hard upon a pavement or other hard surface, the screw-thread would not be liable to be injured so as to interfere with the screwing together or the unscrewing of the parts of the coupling, because of the great thickness of metal formed by the projecting guards. Both the horns *a* and guards *b* are, of course, formed in the same piece or casting with the horn-band.

It will also be observed that when the band A is let fall its open mouth or screw-thread is supported considerably above the ground, and there is little liability of dirt getting into the screw-thread. This is clearly shown in the drawings, in which *c* represents the surface of the ground.

It will also be seen by reference to Fig. 2 that the projecting guards *b* are of such a form at their ends that if the horns *a* should be broken off a monkey or screw wrench could be easily applied to the projections to turn the band A.

The projecting guards *b* are preferably V-shaped or their sides are beveled or slanted from the middle of the width of the horn-band A toward the opposite ends of the coupling, and when so formed an equal amount of metal will give a greater projection of the guards *b*, and will therefore give greater protection.

When lengths of hose are to be coupled or uncoupled in a hurry, as while extinguishing a fire, it is of the utmost importance that the couplings should be in perfect order, and by my invention I obviate the liability of the female screw-thread being injured.

What I claim as my invention, and desire to secure by Letters Patent, is—

1. A horn-band for a screw-coupling, having guards projecting therefrom between the horns, both said guards and horns being formed in the same piece or casting with said band and forming rigid projections thereon, substantially as and for the purpose specified.

2. The horn-band A of a coupling, having the horns $a$, and also having between the horns the V-shaped or beveled guards $b$, substantially as described, and for the purpose set forth.

M. DILLMEIER.

Witnesses:
FREDK. HAYNES,
ED. GLATZMAYER.